3,306,600
DEVICE FOR DAMPING ABRUPTLY-APPLIED TENSION FORCES

Rene Roux and Bernard Pierre, both of 181 bis Ave. de Grasse, Cannes, France
Filed Jan. 7, 1965, Ser. No. 423,908
Claims priority, application France, Jan. 8, 1964, 959,734, Patent 1,388,127
2 Claims. (Cl. 267—74)

This invention relates to damping devices capable, by resilient elongation, of quickly reducing the amplitude of a shock resulting from an abruptly-applied tension force.

Such a device has already been proposed which comprises a large resilient ring provided with two coupling members connected by a safety chain and to which the tension forces are applied. This device has the disadvantage of being cumbrous, and somewhat dangerous, because the movements of the chain are in no way limited. Moreover, the apparatus of which the device forms part is not held at rest, which again contributes to increasing the freedom of movement of the said chain.

A device has also been suggested which is constituted esesntially by two parallel rods yoked by means of resilient members, such as bands, the rods being slidable in grooves provided in a casing. As a result, when the directions of the forces do not coincide with this sliding motion, the rods tend to wedge in their respective grooves. Moreover, when the forces are very violently applied, the rods abut against the casing at the extremities of the grooves and suffer multiple flexing which may give rise eventually to breakage.

Further a device has been proposed which comprises a first cable divided into two sections each attached to a disc closing the opposed ends of two telescopic parts, the device also comprising a second cable traversing the two discs and used as an inextensible safety member.

These discs are connected in a perpendicular direction to their planes by springs. As a result, they carry all the forces and suffer deformations, these deformations being passed to the sliding parts of the tubes and giving rise to malfunctioning of the apparatus of which the device forms a part.

Moreover, the second cable rubs against the edges of the openings formed in the disc for its passage, and wears away rapidly, which in the long term leads to breakage of the apparatus of which the device forms part.

The present invention has for its object a novel resilient device which is capable of overcoming the disadvantages indicated hereinbefore and which is easy to make.

According to the present invention there is provided a device for damping abruptly-applied tension forces comprising, an inner tubular member, an outer tubular member in telescopic relationship with the inner tubular member, coupling means secured to each tubular member, at least one resilient member connecting the coupling means and lying within the inner tubular member, and a flexible substantially inextensible member connecting the coupling means and lying within inner tubular member, an abruptly-applied tension force on the coupling means being resisted by the resilient member and excess telescopic movement of the tubular members being resisted by the flexible member.

Further according to the present invention there is provided a device for damping abruptly-applied tension forces comprising, an inner tubular member, an outer tubular member in telescopic relationship with the inner tubular member, a disc secured at one end of the inner tubular member, a disc secured at one end of the outer tubular member, the two discs being disposed at opposed ends of the device, a pin passing through and secured to the disc of the inner tubular member, a pin passing through the disc of the outer tubular member, attachment means secured to each pin at its outer end, a cross-member mounted on each pin and extending transversely of the pin, at least one resilient member interconnecting the cross-members, and a flexible substantially inextensible member connecting the pins and lying within the inner tubular member, an abruptly-applied tension force on the attachment means being resisted by the resilient member and excess telescopic movement of the tubular members being resisted by the flexible member.

Three embodiments of resilient devices in accordance with the invention will now be described, by way of example with reference to the accompanying diagrammatic drawings, in which.

Figure 1:
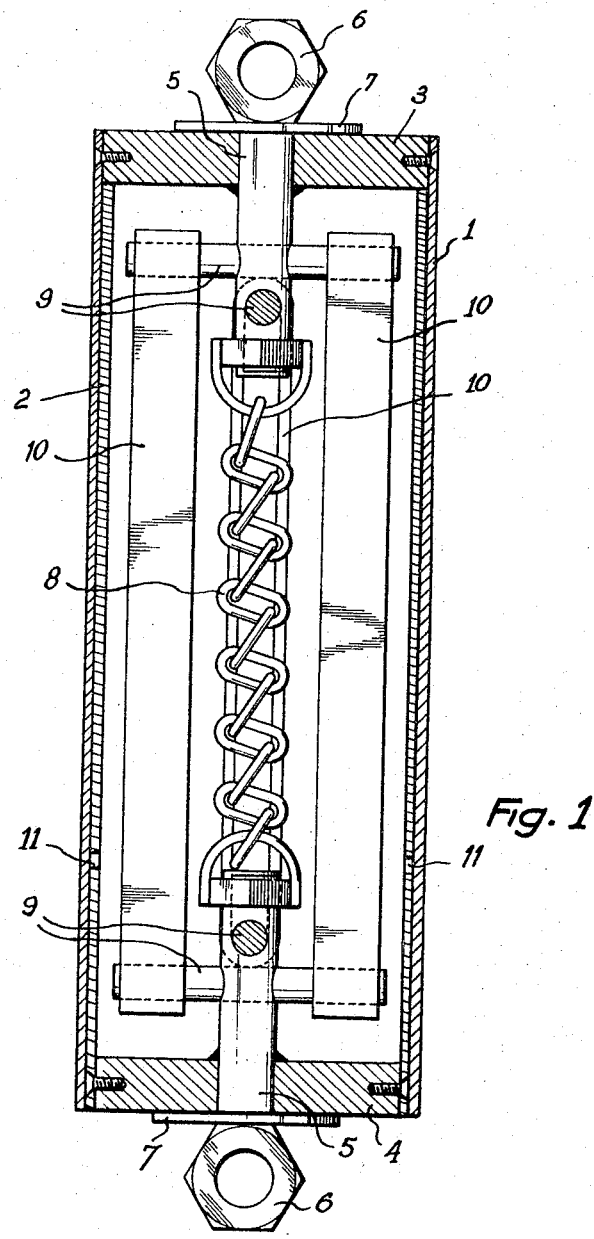
FIG. 1 shows a longitudinal section of one embodiment.

Referring now to the drawings and in particular to FIG. 1, the device comprises two tubular telescopic parts or members 1 and 2, made, for example, of a synthetic-resin material, and closed respectively by two opposed, rigid, end members or discs 3 and 4, made, for example of steel. The part 2 is slidable in the part 1. Each of the end members 3, 4 is traversed by a rigid pin 5, for example of steel, and each pin is welded to the end member and is provided at its outer end, with rings 6 of hexagonal outer profile which serve as coupling members. Each pin carries in the region of the ring 6, a washer 7, in contact with the corresponding end member 3, 4, in order to maintain the pin in position on the end member, whatever the magnitude of the forces which it carries.

The two pins 5 are connected by a safety member 8 constituted by a chain the length of which is less than that of the parts 1 and 2 in order to prevent their disengagement if an excessive telescopic movement occurs.

Each pin 5 carries, on its part positioned within the tubular parts 1, 2, with a pair of rigid transverse rods 9, supporting resilient members 10 constituted by two continuous bands 10 made for example of rubber or a synthetic-resin material.

The transverse rods 9 and the resilient members 10 encircle the safety chain 8 symmetrically in order to facilitate the best distribution of the forces.

The telescopic parts are assembled in such a manner that the interior space is fluid-tight. Also the interior tubular part 2, has towards its end member 4, two apertures 11. These apertures are covered by a portion of the exterior tubular part 1 when the device is at rest, as shown in the drawing and are uncovered when the device is extended.

In the rest state, the bands 10 are in tension and draw the two pins towards one another. The open end of the sliding inner part 2 thus abuts against the end member 3. When a tension, of a magnitude higher than the magnitude of the tension in the bands is applied to the rings 6, the parts 1 and 2 move apart from one another. This displacement creates a depression in the space enclosed by the parts and gives rise to a supplementary damping of pneumatic or hydraulic nature, which augments the resilient damping.

When the apertures 11 are uncovered, ambient fluid, for example air, enters the interior of the device, the supplementary damping is suppressed, only damping due to the action of the resilient members remaining effective.

When the tension force on the rings 6 ceases, the parts 1 and 2 return towards one another by means of the resilient bands 10. The fluid then in the interior of the parts is discharged through the apertures 11.

When the latter are again covered up, the space within the parts again becomes fluid-tight and the supplementary damping opposes the action of the bands, retards the movement of the part 1 towards the part 2 and thus reduces the impact between the open end of the inner part 2 and the end member 3 of the outer part 1.

This device has an application of particular interest for mooring boats. If stretched permanently, it gives rise to a convenient stiffening of moorings. Moreover, it is frequently immersed in the water which is then used for the supplementary damping.

Figure 2:
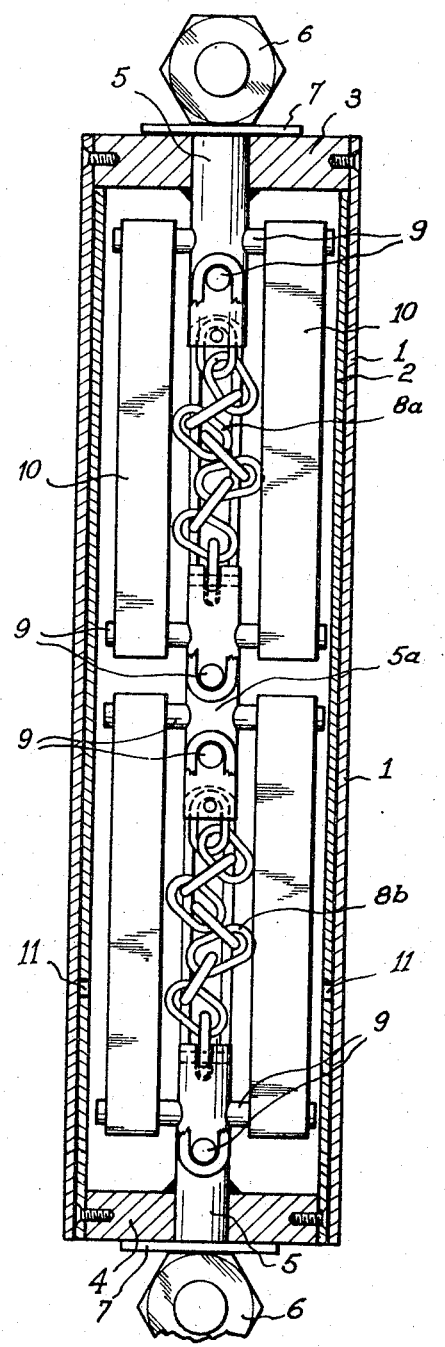
FIG. 2 shows a longitudinal section of a second embodiment.

In the embodiment shown in FIG. 2, the device includes an intermediate pin 5a situated between the two end pins 5 and is connected to the latter by the safety chain 8 which is divided into two sections 8a and 8b. The intermediate pin 5a is similar to the end pins 5 and like them carries transverse rods 9, connected respectively to groups of transverse rods of the end pins by the bands 10.

The operation of this device is identical to that which has been described hereinbefore with reference to FIG. 1. This arrangement is particularly advantageous for the construction of devices of greater length, since it enables the use of bands 10, sections of chain 8 and rods 9 of standardised dimensions. Moreover, in case of breakage of one of the bands, this arrangement permits a better distribution of the forces on the remaining bands without breakage of the damping device as a whole.

Figure 3:
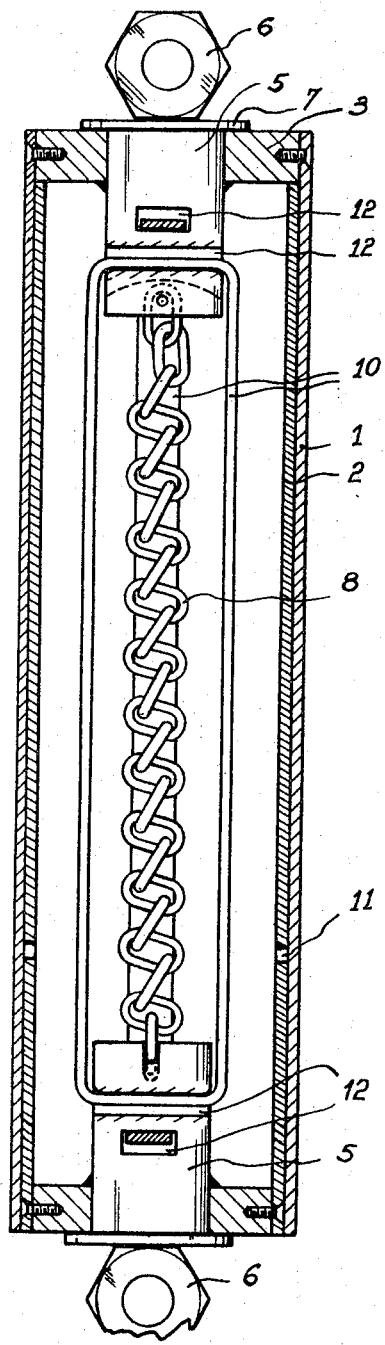
FIG. 3 shows a longitudinal section of a third embodiment.

FIG. 3 shows another embodiment which is a modification of that shown in FIG. 1. This embodiment differs essentially from that which has just been described, by the presence of transverse passages 12 formed in the pins 5 and permitting the passage of the resilient bands 10. This arrangement enables the transverse rods 9 to be omitted, the tension forces being taken only by the pins 5.

The invention is not limited to the embodiments described and shown, but it covers on the contrary all modifications relating, in particular, to the dimensions of the device, its usage, the form of the attachment members 6, the nature, the number and the distribution of the resilient members 10, the nature and the form of the attachment elements for the resilient members 10 to the pins, the nature of the safety member 8 and the number of intermediate pins 5a.

In effect, without departing from the scope of the invention, the resilient members 10 may be constituted by springs and the inextensible flexible member 8 by a cable.

Thus, in the above particularly described device, all the forces are taken up by the pins which work solely under tension and, as a result, under the best conditions.

The telescopic members do not support any force and they are assembled in such a way that their internal space is fluid-tight. Also, according to a particular feature of the invention, the inner member has, in its side wall, at least one aperture located, preferably towards its closed end.

The presence of this aperture permits essentially, at the end of the inward stroke of the telescopic members, opposition to the action of the resilient members by way of hydraulic or pneumatic damping, in order to reduce the shock between the open end of the inner member and the closed end of the outer member.

We claim:
1. A device for damping abruptly-applied tension forces comprising,
   an inner tubular member,
   an outer tubular member in telescopic relationship with the inner tubular member,
   a disc secured at one end of the inner tubular member in fluid-tight relationship therewith,
   a disc secured at one end of the outer tubular member in fluid-tight relationship therewith,
   an elongate member passing through and secured to the disc of the inner tubular member in fluid-tight relationship thereto,
   an elongate member passing through and secured to the disc of the outer tubular member in fluid-tight relationship thereto,
   attachment means secured to the outer end of each elongate member,
   at least one resilient member interconnecting the pins,
   means securing the resilient member to the pins, and
   a safety member interconnecting the pins to prevent disengagement of the telescopic members on application of an excessive force to the attachment means,
   an abruptly-applied tension force on the attachment means being resisted by the resilient member and by pneumatic or hydraulic damping afforded by fluid-tight relationship of the telescopic members.

2. A device for absorbing abruptly-applied tension forces comprising,
   an inner tubular member having apertures therein towards one end,
   an outer tubular member in telescopic relationship with the inner tubular member,
   coupling means secured to each tubular member,
   at least one resilient member connecting the coupling means and lying within the inner tubular member, and
   a flexible substantially inextensible member connecting the coupling means and lying within inner tubular member,
   the tubular members being so fitted that the space enclosed thereby is substantially fluid-tight whereby an abruptly-applied tension force at the coupling means is resisted by the resilient member and by pneumatic or hydraulic damping afforded by the fluid-tight relationship of the tubular members until the telescopic movement of the outer tubular member uncovers the apertures in the inner tubular member.

References Cited by the Examiner

UNITED STATES PATENTS

| | | | |
|---|---|---|---|
| 294,944 | 3/1884 | Wiegleb | 267—74 |
| 1,598,480 | 8/1926 | Deal | 267—74 |
| 2,509,357 | 5/1950 | Krause | 267—73 |

FOREIGN PATENTS 893,564  2/1944  France.

ARTHUR L. LA POINT, *Primary Examiner.*

R. W. WOHLFARTH, *Assistant Examiner.*